Jan. 17, 1939.　　　　　F. HUNTER　　　　　2,143,946
METHOD OF MANUFACTURING SIGNS AND OTHER DISPLAY DEVICES
Filed April 13, 1936　　2 Sheets-Sheet 1

INVENTOR.
FREDERICK HUNTER
BY
Richards & Geier
ATTORNEYS

Jan. 17, 1939.　　　　F. HUNTER　　　　2,143,946
METHOD OF MANUFACTURING SIGNS AND OTHER DISPLAY DEVICES
Filed April 13, 1936　　2 Sheets-Sheet 2

INVENTOR.
FREDERICK HUNTER
ATTORNEYS

Patented Jan. 17, 1939

2,143,946

UNITED STATES PATENT OFFICE 2,143,946

METHOD OF MANUFACTURING SIGNS AND OTHER DISPLAY DEVICES

Frederick Hunter, Southbourne, England

Application April 13, 1936, Serial No. 74,073
In Great Britain May 30, 1935

3 Claims. (Cl. 41—36)

This invention relates to methods of providing brilliantly visible signs and other display devices and to articles manufactured by these methods.

The present invention involves the use of a substantially continuous layer of comparatively small light-transmitting beads which are located over a surface of the display device in such manner that this surface constitutes a reflecting background for the beads.

Such beads may consist of glass and may have the form of small spherical bodies of about one sixty-fourth or one thirty-second of an inch in diameter.

Whenever the display device is illuminated, the beads which transmit the light thrown upon them to their background will concentrate the light reflected by such background, so that the layer of beads and the underlying background function as a very large number of small light-concentrating and reflecting units.

If a source of light which may be comparatively strong diffused light is situated close to the beads, each bead will appear to the observer in the form of a small brilliant spot or pinpoint of light. If the light is not so strong, or if the bears are very small, or if the observer is situated at some distance from the display matter, the observer will be unable to see the individual beads, although he will clearly notice the effect produced by the beads. Such effect will consist in that the surface carrying the beads will appear more brilliant to the observer, even if he is stationed at a comparatively acute angle to this surface. Furthermore, the distinction between the shaded and the light portions of the display matter or between the various colors thereof will be enhanced by the light-concentrating action of the beads, even though the individual beads will no longer be seen.

Consequently, the effect of the layer of beads is to render the display matter brilliantly visible and enhance its coloring or shading effects, thereby attracting the attention of an observer to the display device.

Practical experiments have shown that through the use of the described layer of beads, the light falling upon such beads at any suitable angle is reflected by and through the beads in substantially the same direction, giving a clear-cut and readily readable image of the display matter. Each bead concentrates the light falling upon it, thereby increasing the intensity of illumination of the display matter constituting the reflecting background.

Since a display device of this type will not diffuse light thrown upon it but will concentrate the same, even when brilliantly illuminated by a source of artificial light, it is particularly suitable for outdoor displaying and advertising, including sign posts, road and streetsigns, license plates and the like.

The present invention is concerned with the application of the described layer of transparent beads to a surface covered by a coating of an opaque reflecting adhesive substance, such as paint.

Display devices of the type of highway signs or railway signs, as well as many other display devices or advertising devices consist usually of a plate which is made of metal, and which carries the display matter, such display matter being embossed or painted upon the plate or applied thereto in some other suitable manner. The display matter which may consist of letters, numerals, designs, symbols or the like is usually covered by a coating of paint of a different color from the paint which covers the background.

An object of the present invention is the provision of display and advertising devices of the described type which are extremely brilliant.

Another object is the provision of display devices of the described type of enhanced visibility, such devices being brilliantly illuminated by any light thrown upon them over a wide angle.

The above and other objects of the present invention may be realized through the provision of a display device which is covered by a coating of paint, varnish, lacquer or other solidifiable opaque reflecting adhesive material, said coating carrying a layer of small transparent or translucent beads and constituting a reflecting background for these beads. The beads are preferably applied uniformly in large numbers over the surface which is to be rendered more brilliant, with the result that the beads form a substantially continuous surface.

One of the preferred methods of covering the display device with a layer of beads consists in applying a coating of paint, varnish, lacquer or the like over the plate or other display matter and then applying the beads to the coating while the coating is still wet and tacky, i. e., in a non-solid state, with the result that the beads are partly immersed in the coating. Then the coating is caused to solidify so that the beads are firmly fixed therein. The coating should be opaque and reflecting so as to form a reflecting background for the beads.

The invention will appear more clearly from the following detailed description when taken in connection with the accompanying drawings, showing by way of example, preferred embodiments of the inventive idea.

In the drawings:—

The beads 25 used for the purposes of the present invention are preferably spherical in shape, although beads of ellipsoidal or lenticular shape, or of any irregular shape approximating to the above geometrical figures may be employed.

It is advisable to arrange the beads substantially closely together upon a supporting layer so that the beads form a continuous surface. Of course, in certain instances the beads may be spaced further apart, although then the degree of brilliancy and the striking appearance of the poster will not be so pronounced.

The size of the bead employed may be varied according to the size and nature of the display devices to be constructed. The beads preferably consist of glass, although any other suitable transparent or translucent material, such as vinyl resin or any other known transparent synthetic composition may be employed.

It is advisable to use glass beads which are sold under the trade name of "Crystal Ballotini Beads". Such beads are available on the market in sizes ranging from about eight-thousandths of an inch in diameter to a diameter of about two millimeters, and upward. Beads of a smaller size, i. e., of a diameter of about eight-thousandths of an inch are useful for small display devices, or for devices where fine detail is desired. For larger scale display matter, poster work, shop facias, highway signs and the like, it is advisable to use beads of a larger diameter, for instance, beads of about one millimeter in diameter.

The beads may be entirely transparent when it is desired to enhance the color effect of the display matter forming the background and not to alter the same. However, the beads may be colored in one or many colors to give a single color or a multi-color effect.

Figure 1:
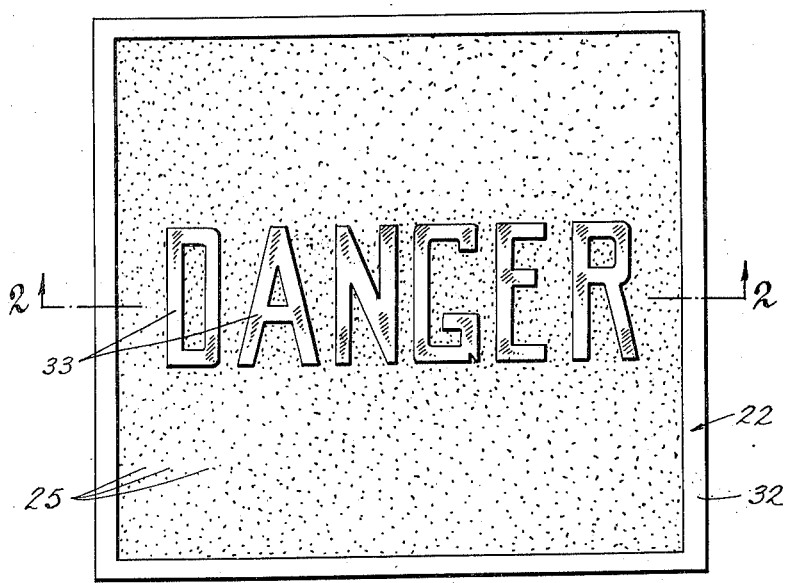
Figure 1 shows a street sign constructed in accordance with the principles of the present invention.
Figure 2:
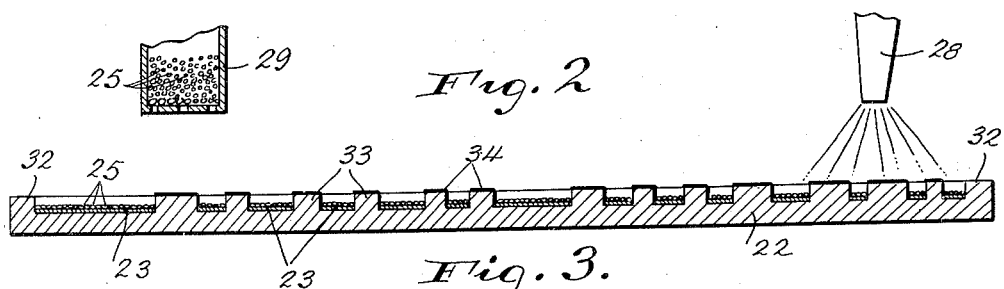
Figure 2 is a section along the line 2—2 of Figure 1 on a larger scale and illustrates methods of applying the beads to a display device.
Figure 3:
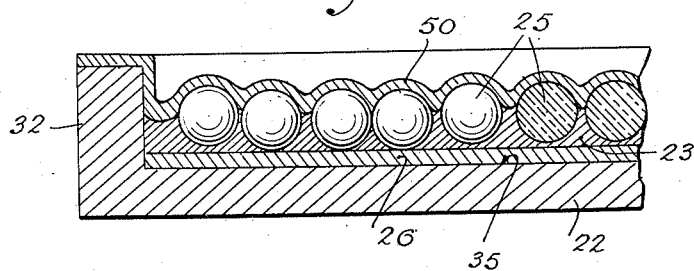
Figure 3 is an enlarged sectional view of a part of a sign shown in Figures 1 and 2, and illustrates on an enlarged scale methods of preparing the layer supporting the beads.

The display device shown in Figures 1, 2 and 3 of the drawings consists of a support or base 22 having the form of a plate which is made of iron, tin or any other suitable material. The layer of beads 25 covering the background for the display matter is embedded in a layer 23 which covers the base 22.

The coating 23 may consist of any paint of the generally used type or other suitable opaque reflecting adhesive solidifiable substance. For example, this substance may consist of a mixture of a pigment with an adhesive and a solvent for the adhesive.

As an adhesive, glycerol phthalic acid condensation products known under the trade name of "Glyptal", or the polymerized styrol compound known under the trade name of "Trolitul" may be used. A suitable solvent for "Glyptal" is butyl phthalate, although hydrocarbon solvents of similar properties, such as the solvents known under the name of xylol may be employed.

The simplest method of manufacturing the illustrated display device consists in applying the coating 23 to those surfaces or portions of surfaces of the plate 22 which are to be covered with the beads, and then applying the beads 25 to the layer 23 while it is still wet and tacky, i. e., in a non-solid state.

The beads 25 may be applied by strewing them by hand or by blowing them, for example, from a compressed air gun 28, as shown in Figure 2. Alternatively, the beads may be dropped onto the layer 23 by gravity from a container or hopper 29 (Fig. 2) provided with an open or perforated bottom, the container being moved over the stationary plate 22 or the plate 22 being moved under the stationary container 29.

Then the coating 23 is allowed to solidify, for instance, by drying in open air or by placing the plate 22 in a stove. Finally, the projecting portions 33 of the plate 22 which are devoid of beads are covered by a layer of paint 34 (Fig. 2).

The beads should preferably be half embedded in their background paint or the like, as shown in Fig. 3. This gives advantageous results, since maximum adhesion and a maximum reflecting angle are thereby attained. The various controllable factors existing during the manufacture of the device, such as the force with which the beads impinge on the adhesive, the capillary attraction between the beads and adhesive, the thickness of the adhesive layer, may be made use of, by suitable regulation, to obtain the desired result.

Practical experience has shown that if the beads 25 are allowed to sink too far into the background coating of paint so that they come into contact with the surface 35 of the base, a considerable loss of efficiency will result, since the reflecting background formed by the paint will be interrupted at the point of contact between the beads 25 and the base 22. Since the base itself is usually made of metal or wood and its surfaces are substantially non-reflectant, a bead contacting such surfaces of the support will be unable to reflect the same amount of light as a bead, the reflecting background of which is formed entirely by the coat of paint. Consequently, contact of beads with the surface 35 of the base will produce spots and other undesirable effects diminishing the light reflected and concentrated by the beads.

The above drawback may be eliminated if the paint is applied to the base 22 in several layers.

First, a primary undercoating 26 of background paint (Fig. 3) is applied upon the surface 35 of the plate 22. Then the plate 22 carrying the coating 26 is placed in a stove having any suitable temperature and is kept there until the layer 26 dries and hardens. It is not necessary that the layer 26 be completely hardened, although it must be sufficiently hard to prevent the beads 25 from sinking into it. Any desired number of layers may be applied one after the other and dried simultaneously or successively to form the layer 26.

Then a top layer 23 of the same or different paint is applied over the hardened underlayer 26 and while the top layer 23 is in a non-solid state, i. e., while it is still tacky and adhesive the beads 25 are applied to it by spraying or the like. The beads sink to a certain extent into the layer 23, as illustrated in Figure 3. Then the layer 23 is caused to solidify and harden, for instance, by placing the plate 22 again in a stove. When the layer 23 is hardened the beads 25 will be firmly embedded in the layer.

As shown in Fig. 3, either the layer 23 alone or both the layer 23 and the layer 26 form a reflecting background for the beads.

In certain instances it may be found necessary to apply the beads to a display device covered by a sufficiently thick coat of paint which is hard and dry. This instance may arise where the area to be treated with the beads is so large that the paint will solidify before the beads are applied to it, or where a plurality of colors is used, or where an existing painted display device is to be covered by a layer of beads.

The simplest method of embedding a layer of beads in an existing painted display device is to cover the hard coat of paint by a non-solid layer of the same or similar paint which will adhere to the hard undercoating, apply a layer of beads to the upper layer of paint and then cause the upper layer to solidify.

If the display device consists of hardened paints of several colors, it is preferable to soften these hard paints by covering them with any suitable paint solvent or softening agent. However, the layers of paint should not be softened completely to prevent excessive penetration of the beads. The beads are pressed into the softened upper layers of the paints which are then allowed to solidify.

In order to eliminate the necessity of pressing the beads into the softened upper layers of the paints, another method may be used which consists in covering the layers of the paints by a transparent adhesive mixture after these layers have been softened by the application of the softening agent.

Such adhesive mixtures are available on the market and consist of a mixture of the basic gum with a solvent. When selecting such adhesive mixtures care should be taken to employ an adhesive mixture, the solvent of which will mix properly with the softening agent previously applied to soften the upper layers of the paints.

Then the surface treated in this manner is covered by the beads; finally, the adhesive and the softened layers of the paints are caused to solidify. The upper layers of the paints and the adhesive will both hold the beads which will partly penetrate into the layers of paint. These layers of paint will constitute the sole reflecting background for the beads.

The separate operation of softening the upper layers of paint may be eliminated, provided that an adhesive mixture is used, the solvent of which is at the same time a softening agent for the hard layers of paints. Then the method of embedding the beads will consist simply in covering the hard layers of paint by an adhesive mixture, the solvent of which will soften the upper layers of paints, applying the beads to the surfaces thus treated, and then causing the softened layers of paint and the adhesive to solidify. In this case also the upper layers of the paint and the adhesive will both hold the beads, but only the layers of paint will constitute the reflecting background for the beads.

Of course, the hard layers of paint need not be softened and the beads may be held thereon merely by a transparent adhesive.

The described methods of embedding the beads may be used not only in connection with existing display devices, but also in connection with display devices which are being manufactured from raw materials.

The sign shown in Figure 1 is of the type generally used on roads and intended as a warning for motorists or pedestrians. The raised portions 33 of the sign which are covered by the layers 34 of black paint, or paint of any other color, form letters, characters or designs upon the sign. The plate 22 constituting the base of the display device is surrounded by raised edges 32 so that the sign has the appearance of a flat shallow tray. The layer of beads 25 covers the background of the display matter which is devoid of beads. The light-transmitting beads 25 impart brilliance to the background and thus render the sign and the inscription thereon more strikingly visible. The dots and dashes shown in Fig. 1, as well as in Figs. 4 and 5, are intended to represent brilliant pinpoints of light visible to an observer.

This form of the invention has many applications, for example, it may be applied to highway signs, house numbers, street or other name plates, road vehicles number plates and the like, and advertising devices, or shop facias formed on a background of metal, wood or other opaque material.

In connection with devices destined for exposure to weather it was found that a coating of transparent enamel 50 covering an exposed surface of the display device (Fig. 3) gives greater protection and prevents the disintegration of the paint resulting from changes in temperature and bad weather.

Figure 4:
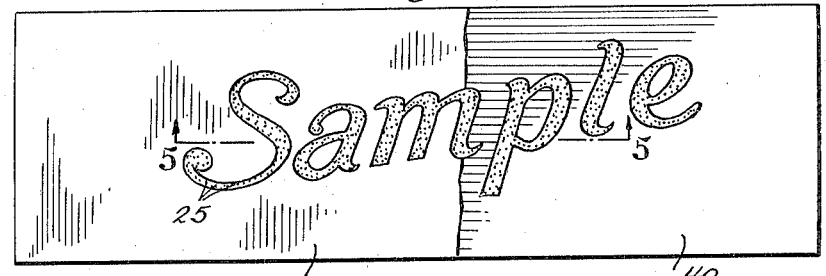
Figure 4 shows a display device of an alternative form.
Figure 5:
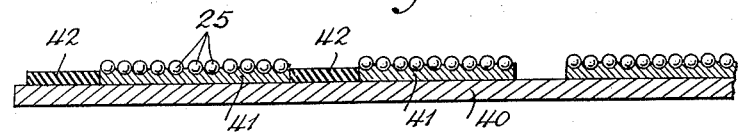
Figure 5 is a section along the line 5—5 of Figure 4 on an enlarged scale.

The display device illustrated in Figures 4 and 5 of the drawings comprises a supporting base 40 carrying an inscription formed by layers 41 of paint which carry the beads 25. The parts of the surfaces of the support 40 which are not covered by the layers 41 are covered by a suitable layer 42 of paint or the like usually of a different color from that of the layer 41, and which constitutes a contrasting background for the inscription. This display device may be manufactured by any of the above described methods.

Figure 6:
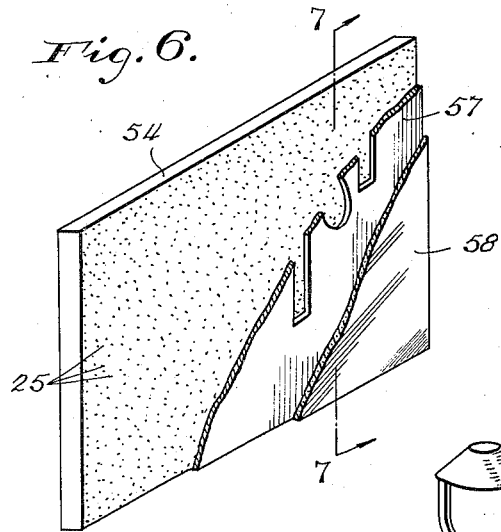
Figure 6 shows a display device comprising a layer of beads covered by a stencil, some parts of the display device being broken off.
Figure 7:
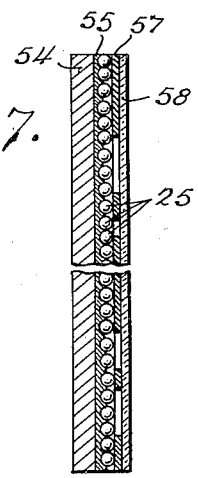
Figure 7 is a section along the line 7—7 of Figure 6.

The display device illustrated in Figures 6 and 7 comprises a base plate 54 which is provided with a background coating 55 of paint or the like in any suitable color or color combination, the layer 55 being uniformly coated with a layer of beads 25. A dark stencil 57 of the display matter is placed in front of the painted and beaded surface of the plate 54 and a glass plate 58 or a coating of transparent waterproof varnish, lacquer or the like may then be applied to the stencil for protective purposes.

It is not always necessary to apply the beads to an object specifically manufactured for the purpose, such as a particularly shaped plate of metal, wood or other suitable material to form a display device, but a display device may be formed in situ on an existing object. For instance, a highway sign embodying the principles of the invention may be directly formed on a telegraph or telephone post, traffic guide post, street lamp post, walls and the like, by applying to such object paint and spreading beads thereon in the described manner.

Figure 8:
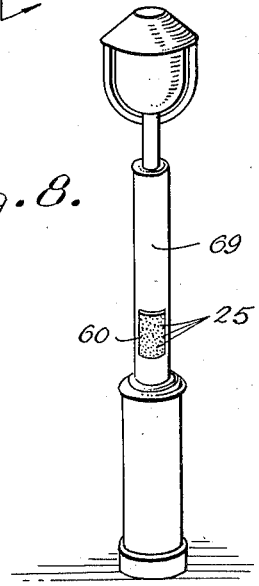
Figure 8 illustrates the application of a layer of beads to a fixed object.

As an example, Figure 8 illustrates a lamp post 69, a portion of the surface of which is covered by a layer 60 of paint or the like on which the beads 25 are sprayed.

Numerous variations and alternatives in the details of construction and arrangement of the devices are possible without departing from the present invention, particularly as varying practical requirements call for varying types of devices. For example, a globe may be treated with beads to give the effect of a brilliantly illuminated globe when viewed by external light, or the rear mudguards of vehicles, including pedal cycles, may similarly be treated to provide a red rear reflector or other brilliant warning sign.

What is claimed is:—

1. The method of providing brilliantly visible display devices, which comprises softening a solid layer of a solidifiable opaque reflecting substance by a softening agent to render at least a part of said layer non-solid, covering the softened surface of said layer with a non-solid layer of a solidifiable adhesive substance, applying small light-transmitting beads to the second-mentioned layer and to the softened part of the first-mentioned layer to form a substantially continuous layer of beads embedded in said part of the first-mentioned layer, and then causing said part of the first-mentioned layer and the second-mentioned layer to solidify and thereby unite.

2. The method of providing brilliantly visible display devices, which comprises softening a solid layer of a solidifiable opaque reflecting substance by a softening agent to render at least a part of said layer non-solid, covering the softened surface of said layer with a non-solid layer of a solidifiable adhesive mixture containing a solvent mixing with said softening agent, applying small light-transmitting beads to the second-mentioned layer and to the softened part of the first-mentioned layer to form a substantially continuous layer of beads embedded in said part of the first-mentioned layer, and then causing said part of the first-mentioned layer and the second-mentioned layer to solidify and thereby unite.

3. The method of providing brilliantly visible display devices, which comprises covering a suitable base with a layer of an opaque reflecting substance, causing said layer to solidify, covering the solidified layer with a non-solid layer of a solidifiable opaque reflecting substance, applying small light-transmitting beads to the second-mentioned layer while the latter is soft and while the first-mentioned layer is hard, to form a layer of beads embedded solely in the second-mentioned layer, and then causing the second-mentioned layer to solidify.

FREDERICK HUNTER.